Feb. 14, 1967  W. B. HUCKABAY ETAL  3,304,533
MARINE SEISMIC SURVEYING
Filed Dec. 4, 1964  6 Sheets-Sheet 1

INVENTORS
WILLIAM B. HUCKABAY &
WILLIAM H. PARKER
BY
Dunlap & Laney
ATTORNEYS

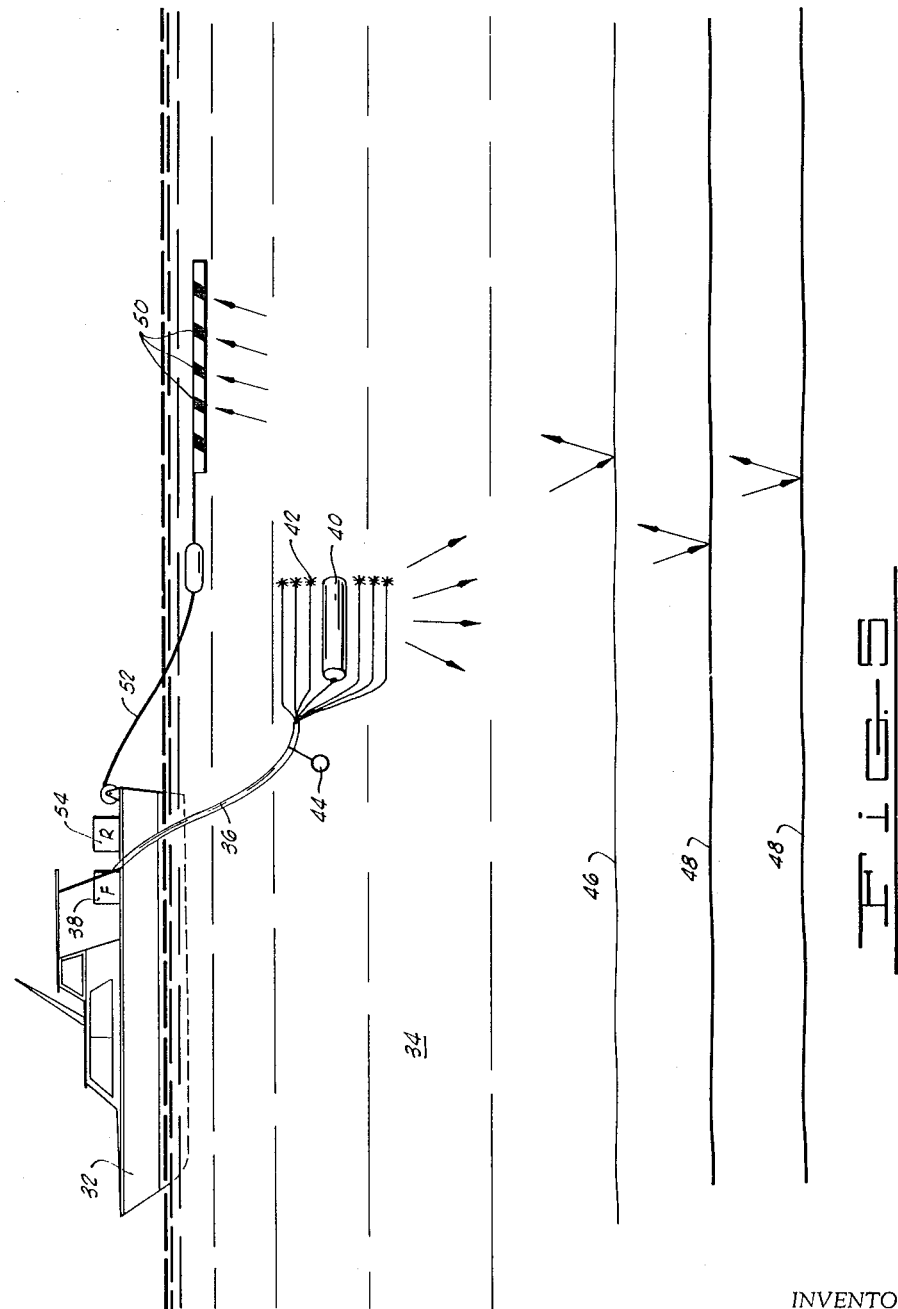

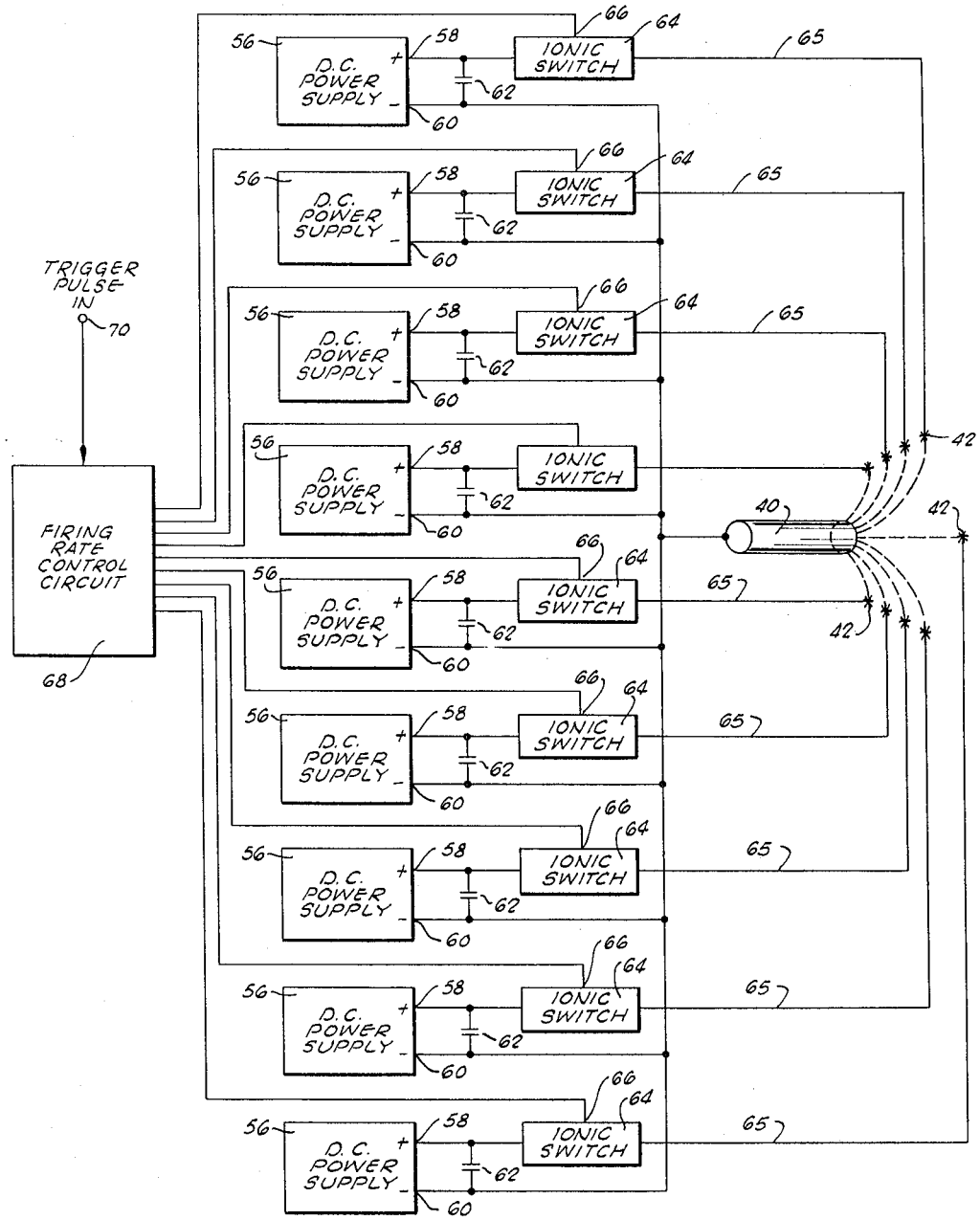

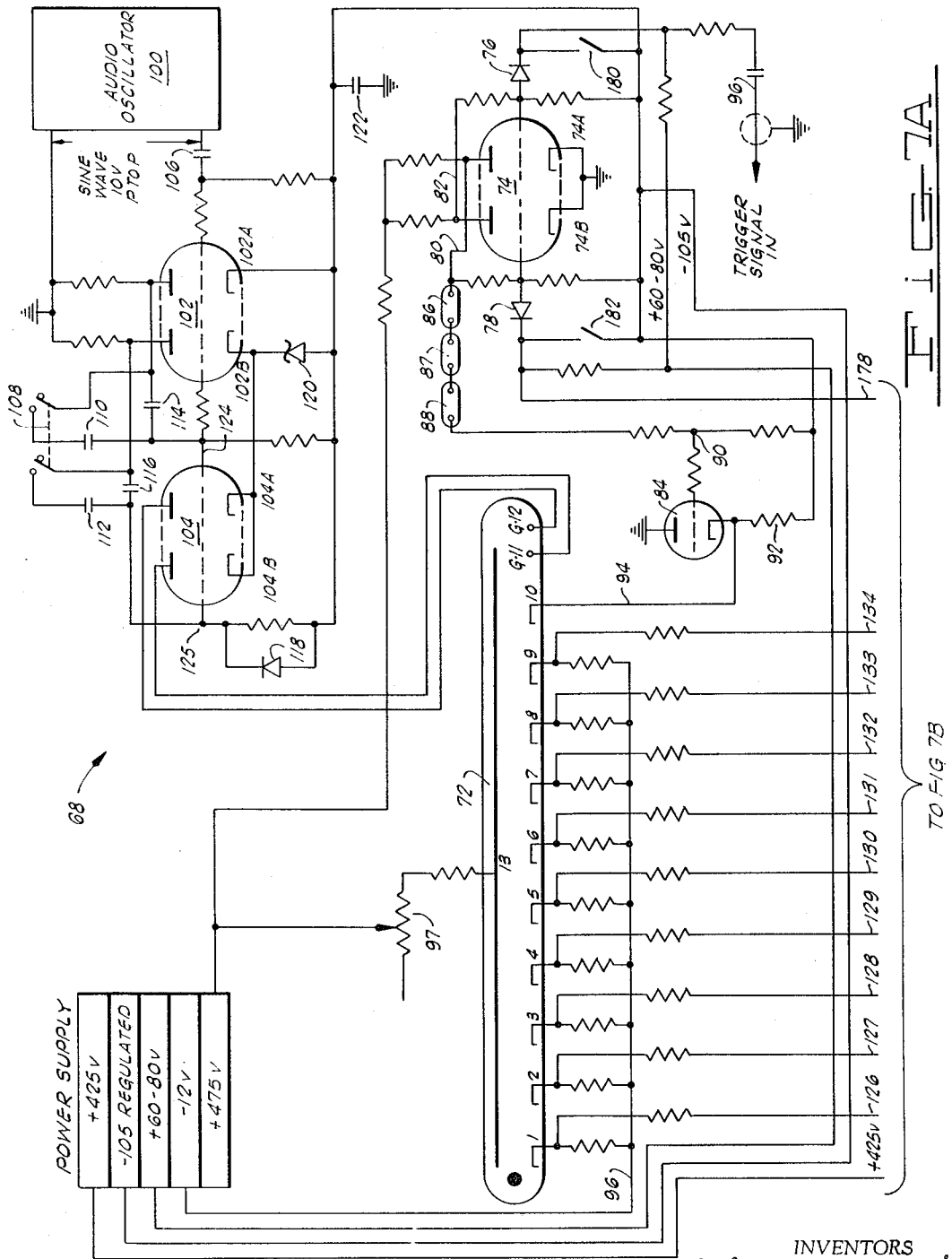

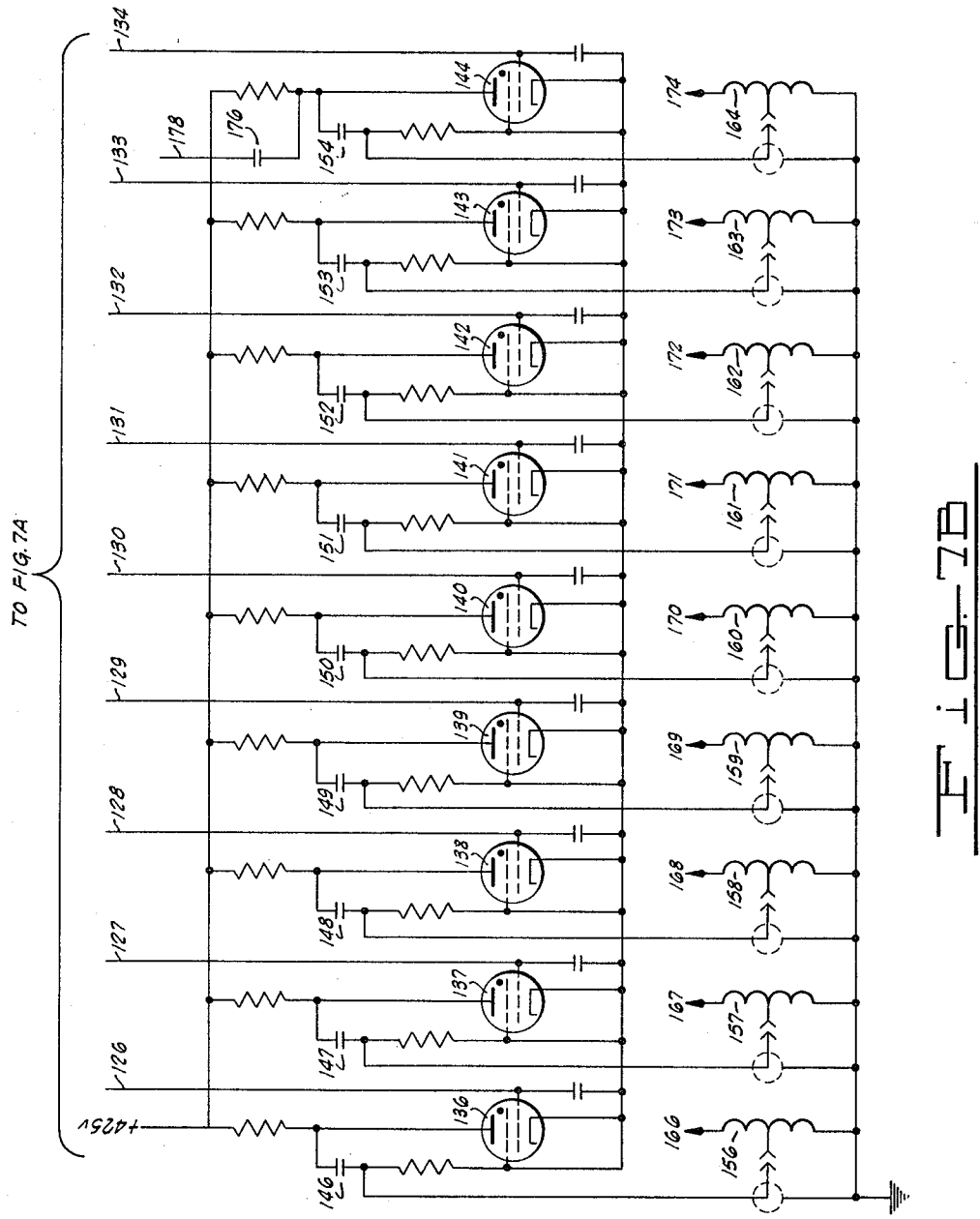

United States Patent Office 3,304,533
Patented Feb. 14, 1967

3,304,533
MARINE SEISMIC SURVEYING
William B. Huckabay, Dallas, and William H. Parker, Richardson, Tex., assignors to Rayflex Exploration Company, Dallas, Tex., a corporation of Texas
Filed Dec. 4, 1964, Ser. No. 416,085
2 Claims. (Cl. 340—7)

This invention relates generally, as indicated, to improvements in the art of conducting seismic surveys of water-covered areas, and more particularly, but not by way of limitation, relates to an improved method and apparatus for conducting marine seismic surveys utilizing an electrical arc in the water as the energy source.

This invention is an improvement upon the subject matter disclosed in the copending application of Huckabay, et al., Serial No. 232,202, now Patent No. 3,251,027, filed on October 22, 1962, and entitled "Seismic Exploration."

As is well known in the seismic art, it is common practice to conduct seismic surveys of water-covered areas. In such surveys, a pressure wave is created in the water which travels downwardly and becomes a seismic wave as it enters the earth. The seismic waves reflected from subsurface interfaces travel back upwardly and are reconverted into pressure waves in the water. These latter pressure waves are in turn detected by transducers known as hydrophones, whereby information relating to the depth and configuration of subsurface strata may be determined.

Various types of energy sources have been utilized to create pressure waves in a body of water, such as charges of explosive, gas guns, etc. However, one of the present day most popular energy sources is an electrical source utilizing spaced electrodes in the water which create pressure waves by forming an arc between the electrodes. An electrical energy source of this type is highly useful in being particularly suited for rather rapid firing when a continuous seismic survey is being conducted, and such devices have been found to provide an appreciable service life. On the other hand, however, such electrical devices have one shortcoming in common with all other known energy sources as they are presently utilized. The pressure wave and, hence, the resulting seismic wave, resulting from the firing of an electrical energy source in a body of water contains a substantial range of frequencies; whereas it is usually desirable to have a rather limited range of frequencies in the seismic wave transmitted into the earth. As a result, a substantial portion of the energy generated by the source is not efficiently utilized. Also, the single firing of an electrical energy source of the type under discussion normally contains a predominant number of frequencies higher than those desired for seismic exploration.

The present invention contemplates a novel system of marine seismic surveying wherein two electrodes are placed in the body of water and a series of potentials are imposed across the electrodes in rapid succession to, in effect, build up the pressure wave created in the water and control at least the predominant frequency of the resulting seismic wave. In other words, the electrodes are sequentially fired in a manner to shape the resulting seismic wave. In one embodiment, the electrodes are fired at varying potentials to obtain a resulting seismic wave resembling a sine wave of the desired frequency and in a second embodiment, the electrodes are fired at substantially equal potentials to obtain a resulting seismic wave more in the nature of a square wave of the desired frequency content.

The present invention also contemplates a novel firing circuit for a pair of electrodes immersed in a body of water wherein the potentials imposed across the electrodes may be easily controlled as to amplitude and rate in order to obtain a resulting seismic wave of the desired amplitude.

One object of this invention is to improve the efficiency of a marine seismic energy source utilizing a pair of electrodes immersed in a body of water.

Another object of this invention is to provide more control over the frequencies contained in seismic waves utilized in marine seismic surveying.

A further object of this invention is to improve the signal-to-noise ratio in marine seismic surveying operations.

A still further object of this invention is to shape the seismic waves utilized in marine seismic surveying and yet form such waves with sufficient rapidity to allow a continuous type of survey.

Other objects and advantages of the invention will be evident from the following detailed description when read in conjunction with the accompanying drawings which illustrate the invention.

In the drawings:

FIG. 5 is a schematic illustration of a portion of the apparatus utilized in a marine seismic survey in accordance with this invention.

FIG. 6 is a block diagram of the circuit utilized in imposing a series of potentials across electrodes in rapid succession to create the pressure waves illustrated in FIGS. 3 and 4.

FIG. 7A is one portion of a wiring diagram of the firing rate control circuit of this invention.

FIG. 7B is a continuation of the wiring diagram illustrated in FIG. 7A.

Figure 1:
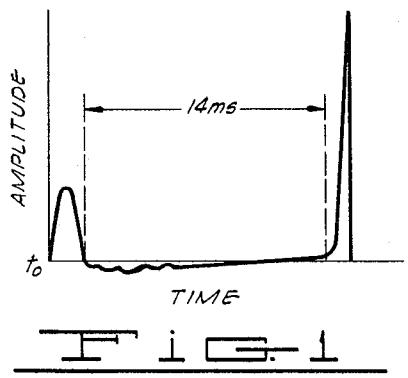
FIG. 1 is a curve illustrating a typical amplitude spectrum of a pressure wave generated in a body of water by the creation of an arc between two electrodes immersed in a body of water.

As indicated above, the shape of a pressure wave in a body of water created by an arc passing between a pair of electrodes immersed in a body of water is illustrated in FIG. 1. It will be noted that the wave rises somewhat like a sine wave and then decreases in a similar manner to below zero. At this time the wave becomes erratic in a negative direction as a result of what is known as cavitation in the water resulting from a release of pressure in the water. Following a relatively short period of cavitation, about fourteen milliseconds, the pressure wave rises sharply to a substantial amplitude and then falls off sharply to zero.

Figure 2:
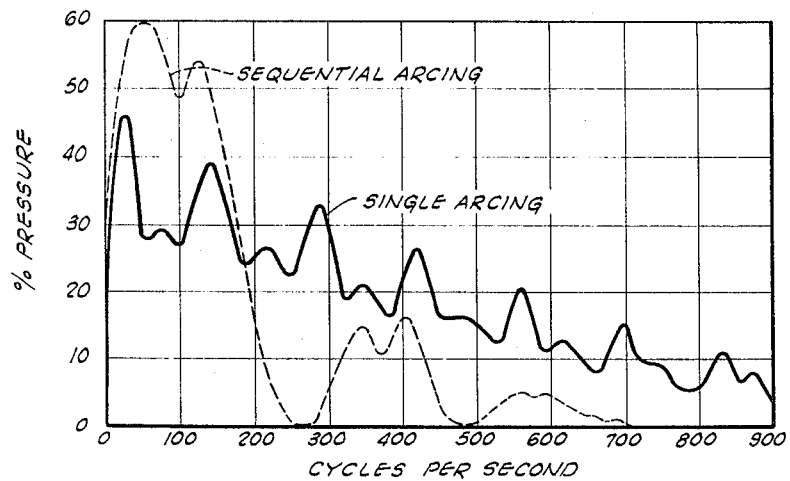
FIG. 2 is a curve showing a typical frequency analysis of a pressure wave such as that illustrated in FIG. 1.

A frequency analysis of a single arc pressure wave as shown in FIG. 1 is illustrated by the solid-line curve in FIG. 2. It will be noted that the greatest percentage of the pressure wave is constituted by the lower frequencies, with a proportionate decrease as the frequency increases. This illustrates very well the desirability of an arc generated pressure wave since the frequencies at about fifty to one hundred cycles have been found to be the most useful in seismic work. The frequency analyses of FIG. 2 have been taken with respect to the pressure wave created in the water, but it has been found that a resulting seismic wave will have at least approximately the same frequency content.

Figures 3, 4:
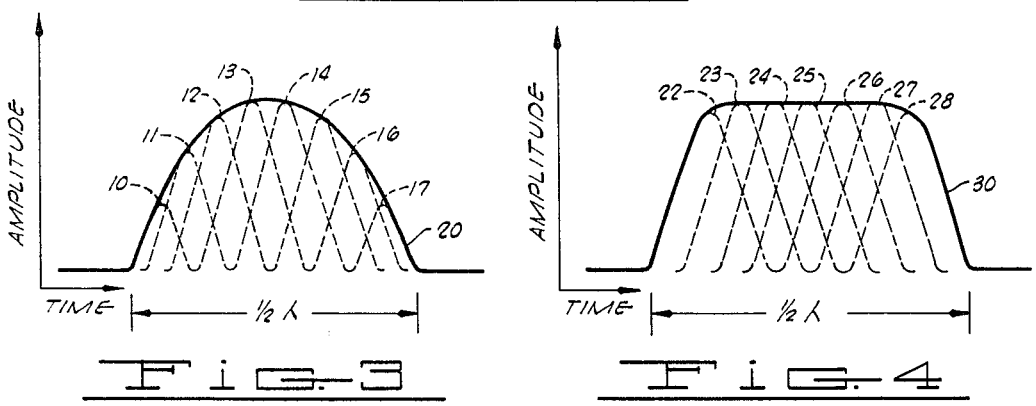
FIG. 3 is a curve illustrating one type of pressure wave which can be obtained by use of the present invention.
FIG. 4 is an alternate pressure wave shape which can be obtained by the present invention.

The pressure wave generated by the firing of a single arc yields an efficiency of thirty to forty percent of desirable frequencies. This is a great advantage in itself over other prior art methods; however, the multiple ng technique of this invention has been found upon
lysis to further accentuate the desirable frequencies
 the pressure wave. The broken-line curve of FIG.
pproximates a frequency analysis of the pressure wave
ated by six sequential arcs. An efficiency as high as
y to sixty percent of the pressure wave has been found
 the low frequencies of fifty to one hundred cycles,
h complementary decrease of higher frequencies and
aneous disturbance.

n accordance with the present invention, a series of
ssure waves are created in the body of water in rapid
cession as illustrated, for example, by the curves 10
ough 17 illustrated in dash lines in FIG. 3. The
ves 10 through 17 represent the initial portion of a
ssure wave of the type illustrated in FIG. 1 and are
ated in sufficiently rapid succession that the waves
rlap and reinforce one another. As a result, the
al pressure wave created in the water will have the
 figuration illustrated by the solid curve 20 when the
ividual pressure waves 10 through 17 are varied in
plitude as shown in FIG. 3. It will be noted in FIG.
at the individual pressure waves 10 through 17 are
er gradually increased in amplitude and then grad-
ly decreased in amplitude, such that the resulting
elope, the solid curve 20, resembles the positive por-
 of one cycle of a sine wave. Further, it will be
erved that the width of the wave 20 will be equal to
-half of the wave length of the resulting pressure
e and, hence, approximately one-half the wave length
he seismic wave resulting from the pressure wave. It
 be readily understood by those skilled in the art that
 controlling the relative amplitudes of the individual
ssure waves 10 through 17, the resulting pressure
e 20 may have substantially any desired predominant
quency content, such as from fifty to one hundred
les as is normally preferred in seismic surveying.

n lieu of an approximate sine wave configuration, the
ividual pressure waves created may be provided with
stantially equal amplitudes as illustrated by the waves
 through 28 in FIG. 4. In this case, the individual
ssure waves 22 through 28 are provided in rapid suc-
sion and in overlapping relation to provide an overall
elope (illustrated by the solid line wave 30) sub-
tially in the form of a square wave. The wave 30 is,
course, the resulting pressure wave. This wave shape
tilized when it is desired to provide more high fre-
ncies in the seismic wave than are obtained with a
es of rapidly successive pressure waves of the type
wn in FIG. 3.

n conducting a marine seismic survey in accordance
 this invention, a vessel 32 (see FIG. 5) is steered
g a predetermined course through a body of water
overlying the subsurface structure to be surveyed. A
able towing cable 36 extends from an electrical power
ply and associated circuits 38 on the vessel 32 into the
er 34 for towing one electrode 40 forming a cathode
 will be described) and a plurality of associated elec-
les 42 forming anodes. The electrodes 40 and 42 are
ed through the water 34 at the desired depth by use of
itable float 44 in a conventional manner.

lectric arcs are passed between the cathode 40 and
h of the anodes 42, in sequence, as will be described
e in detail below, to produce the pressure waves in
 water 34. Each pressure wave travels outwardly in
 directions from the electrodes, including downward-
 as indicated by the arrows in FIG. 5. As each pres-
 wave reaches the sea-bottom or surface 46 of the
h, the pressure wave is converted into a seismic wave
ch travels on downwardly through the substructure.
h interface 48 of the substructure causes a reflection
a portion of the seismic energy as indicated by the
ws at each of these interfaces. The reflected seismic
es travel upwardly and are converted into pressure
es in the water 34 which in turn travel on upwardly.
se latter pressure waves representing the reflected seismic waves are detected by a plurality of hydrophones
50 which convert the pressure waves to electrical sig-
nals. Electrical signals are in turn transmitted through
another towing cable 52 to suitable recording equipment
54 on the vessel 32.

As shown in FIG. 6, the electrode 40 forming a cathode
is preferably in the form of a tubular member constructed
of any suitable conducting metal, and each of the elec-
trodes 42 is preferably the exposed end of a conventional
shielded cable of the type commonly used in marine
seismic work. Although not shown in the drawings, the
electrodes 42 are suitably secured and insulated from the
electrode 40 with the electrodes 42 being spaced equal
distances from the electrode 40, such that when a given
potential is imposed across the electrode 40 and anyone of
the electrodes 42, substantially the same amplitude of
pressure wave will be created in the body of water in
which the electrodes are immersed.

In order to provide a series of rapidly successive pres-
sure waves as previously described in connection with
FIGS. 3 and 4, we provide a plurality of D.C. power
supplies 56, each of which has a positive terminal 58 and
a negative terminal 60. Each power supply 56 is provid-
ed to impose the desired potential across a high voltage
capacitor 62, connected across the terminals 58 and 60,
which can be rapidly discharged for creation of the arc
between the electrode 40 and one of the electrodes 42, as
will be described. All of the negative terminals 60 of the
power supplies 56 are connected in parallel to the cathode
40, and each of the anodes 42 is connected separately
to a positive terminal 58 of its respective power supply
56 through a switch 64. It will, thus, be apparent that
when one of the capacitors 62 is charged, and the respec-
tive switch 64 is closed, the capacitor 62 will discharge
through the respective anode 42 and the cathode 40, and
hence through the body of water, to provide an arc in
the body of water which generates the resulting pressure
wave. It will also be apparent that the amplitude of
the pressure wave will be dependent upon the charge
stored in the respective capacitor 62, such that the ampli-
tudes of the pressure waves produced by the various
power supplies 56 may be controlled by controlling the
potential produced by the power supplies.

In a preferred embodiment, each of the switches 64
is in the form of an ionic switch which is closed by the
imposition of a potential on a firing electrode 66 extend-
ing into an ionic chamber, as is well known in the art.
The firing electrode 66 of each ionic switch 64 is con-
nected to a firing rate control circuit 68 shown as a
block in FIG. 6, but which is shown in detail in FIGS.
7A and 7B and will be explained in detail below. At
this point it is sufficient to say that the firing rate control
circuit 68 is enabled at input 70 by a trigger pulse from
a suitable generator to sequentially energize and close the
ionic switches 64 at a rapid rate, thus providing a series
of successive pressure waves in the body of water in
which the electrodes 40 and 42 are immersed. The total
firing time of all of the ionic switches 64 in each sequence
of operation will, of course, determine the wave length
of the resulting pressure wave. It will also be apparent
that the number of anodes 42 and associated power sup-
plies will be a controlling factor on the wave shapes pos-
sible for the resulting pressure wave. In one experimental
use of the invention, we have utilized nine anodes 42 and
nine associated power supplies 56 in a marine seismic sur-
veying operation.

As indicated above, the firing rate control circuit is
shown in detail in FIGS. 7A and 7B. Referring first to
FIG. 7A, it will be observed that the circuit 68 includes
a decade counter tube 72, having a single anode and a
plurality of cathodes to provide a succession of nine op-
erations each time the tube is fired. We have used a
Sylvania 6910 cold cathode decade counter tube.

The decade counter tube 72 is a gas-filled tube which
has an anode, ten cathodes and twenty guide electrodes.

The anode is placed in the center surrounded by the ring of ten cathodes, with two guide electrodes placed between each two adjacent cathodes. The standard schematic representation, which is used in FIG. 7A, only shows two guides but it should be understood that each of guides G–11 and G–12 is connected in parallel with nine other guides, thus making a total of twenty, and placing one guide electrode of each parallel network between each two adjacent cathodes. It is by means of the guide electrodes that the glow or energization of each cathode is enabled in a predetermined sequence. By pulsing the guides alternately with a more negative potential, the glow can be shifted from one cathode to the next around the entire ring of cathodes. This is well known to those skilled in the art and it is standard operation for the Sylvania 6910 counter tube.

Unless provision is made, the counter tube 72 will count around its circle of cathodes continually. Hence, the No. 10 cathode is reserved in this application for use as a start and reset means for controlling the count or rotational energization of the cathodes. This is done as follows: when the tube 72 is in a non-counting condition, that is, the period in the pressure wave firing cycle when no output is desired, the No. 10 cathode is held at a sufficiently negative potential of about minus sixty volts which causes the glow to remain on that cathode until shifted. The shift will then take place by raising the negative potential to a less negative, minus five volts so that the periodic voltages to the guides G–11 and G–12 can take over and shift the glow around the tube. This shift is initiated by a trigger pulse from the timing means at the recorder (not shown) of the surveying system thus synchronizing the pressure wave firing means with the recorder.

More detailed description of the counter tube operation will follow, but it should be understood that although the pulse voltages from the sequencing generator (stages 100, 102 and 104 as will be described) will be present at the guides of counter tube 72 at all times, the glow-shift can take place only during the short firing interval when the bi-stable multivibrator 74 is shifted to remove the high negative bias from the No. 10 cathode of tube 72.

The enabling stage which removes the high negative bias on the counter cathode is a dual triode 14. This stage functions as a bi-stable multivibrator with halves 74A and 74B conducting in opposition to one another. The cathodes are grounded and each grid is controlled by a similar bias network. Each of the grids is biased from the regulated −105 volts. Diodes 76 and 78, one at each grid input, are polarized to allow application to the grids of a high negative switch pulse (to be described). At the same time, the diodes serve to block any flow of grid current to the stabilizing bias supply of plus sixty to eighty volts.

A functional description of the bi-stable multivibrator will better illustrate the operation of the circuit. Assuming a condition when no pressure wave firing is taking place, tube 74A is conducting and 74B is cut off. When 74A is conducting the sharply reduced plate voltage at the plate of 74A causes a more negative voltage to appear across plate-grid connector 80 to the grid of 74B. This lowered grid voltage at 74B tends to maintain the tube cut off, and therefore with maximum plate voltage; this, in turn, couples a raised voltage via plate-grid connector 82 back across to the grid of tube 74A, maintaining it in conduction. Hence, the stage 74 is in one stable state of operation and will remain there until triggered into its other state.

While stage 74 is in this condition no firing is taking place as the counter tube 72 is disabled as follows. When triode 74A is conducting, a reduced voltage is present across connector 80 which controls the grid of 74B as stated above. This reduced voltage is also connected to the grid of triode 84 through neon glow tubes 86, 87 and 88 to the grid biasing network 90. Tube 84 operates between the regulated −105 volts and ground; hence, th cathode-grid bias is derived from the −105 volt suppl with the plate connected directly to ground. Neon tube 86, 87 and 88 serve to drop the voltage from connecto 80 by sixty volts each, or a 180-volt total, thus lowerin the range of voltage variation to values compatible wit proper grid control of tube 84.

It is seen then that conduction of tube 74A will re flect a reduced grid voltage at grid bias point 90 thu maintaining minimum conduction through the tube 84 In this condition very little current is drawn through th cathode resistor 92, causing less voltage drop and, there fore, a more negative voltage across connection 94 to th No. 10 cathode of counter tube 72. This voltage is o the order of minus sixty volts and is sufficiently negativ with respect to the remainder of the cathodes and guide to cause the glow to dwell on the No. 10 cathode. Sinc there is no glow rotation (sequential cathode enabling there can be no sequential output from the counter tub 72, and no firing of the arcing members.

At the predetermined firing time, a trigger pulse is ap plied at input 96 which is sufficiently negative to cut o tube 74A. This trigger pulse is on the order of −100 volts and is generally obtained from time-base circuitr associated with the recorder equipment. This pulse i applied through diode 76 to the grid of tube 74A, thu ceasing its conduction and allowing a sharp voltage ris at the plate of tube 74A. The rise in voltage is seen a the grid of 74B, firing it into conduction, thus decreasin the plate voltage of 74B and, in turn, the grid voltage o 74A so that it is held at cut off. Multivibrator 74 is no\ switched to its second stable state; that is, the state dur ing which firing is enabled.

With 74B conducting and 74A cut off, the increase i voltage appearing at the plate of 74A is also conducte to the grid bias network 90 of tube 84 where it raises th voltage and increases conduction through tube 84. Thi increased current through the cathode resistor 92 of tub 84 brings about a substantial increase in the voltage dro thereacross; hence, connection 94 places a more positiv bias (about minus five volts) on cathode No. 10 c counter tube 72. This is sufficient reduction in negativ biasing of cathode No. 10 to allow the glow or energiza tion to be rotated to other cathode elements in the counte tube 72, since each of cathodes No. 1 to No. 9 is biase at a more negative minus twelve volts by supply lead 9( A second negative pulse is applied to the grid of triod 74B for reversing the operation or order of stability o multivibrator 74. This will be described later in connec tion with disabling of the firing sequence.

Glow rotation having been enabled, in order to pass th glow from one cathode element to the next in counte tube 72, it is necessary to supply alternate negative pul: ing to the guides G–11 and G–12 situated between eac of the cathodes. The guides are biased slightly more pos: tive than the cathodes, so that preferentially the glo\ will rest on a cathode rather than one of the guide ele ments. The preference of the glow to rest on the prope cathode, even though a negative transfer pulse is applie to ten guide elements simultaneously, is because the prim ing influence of the discharge moves the glow to that catl ode which is closest to the discharge. The proper ad justment of anode potentiometer 97 insures that th anode-cathode potential of counter 72 is at the prope value for maintaining glow on only a single main cathode The alternating negative pulse voltages to the G–1 and G–12 guides are supplied by the audio oscilaltor 10 and amplifier stages comprising dual triodes 102 and 10∠ The timing source 100 is a standard audio oscillato capable of frequency and amplitude adjustment. Th frequency chosen will be dependent upon the wave-shap duration which an operator may decide upon using; sinc the wave length of the input timing signal will contrc the sequence shift of the counter and, therefore, th ount of time between each of the arcs as they are
uentially enabled. Thus, the length of the resultant
ssure wave can be controlled for best utilization of
equipment as might be dictated by the subsurface ter-
1, water temperature, and other factors which might
er in.

'he output of oscillator 100 is a sine wave signal hav-
 a peak-to-peak amplitude of ten volts. This signal
pplied through coupling capacitor 106 to the grid of
overdriven A.C. amplifier 102A operating between
05 volts and ground and utilizing grid leak bias. The
plified signal at the plate of 102A is conducted to two
owing stages. First, it is applied through coupling
acitor 114 to the grid of driver triode 104A where the
ial controls conduction from the plate circuit of tube
A to the guides G–11 of the decade counter tube 72.
ond, the same amplified signal (from the plate of
A) is applied to the grid of triode 102B where it is
plified and reversed in phase for conduction through
pling capacitor 116 to the grid of driver triode 104B.
ver 104B controls conduction to the guides G–12 of
counter tube 72 in the same manner as driver 104A,
 always in the reversed phase; i.e., either the conduc-
 or non-conduction state.

\ switch 108 which parallels capacitors 110 and 112
h capacitors 114 and 116 respectively, provides addi-
ial coupling capacity when the operating mode chosen
 lower frequency range. The diode 118 is provided
 discharge of coupling capacitors 110 and 112 thus
iding any grid blocking of triode 104B. A zener
de 120 provides constant cathode-grid bias of seven
nine volts in each of stages 102B, 104A and 104B.
s bias is chosen such that each of the amplifier stages
l be completely cut off during slightly more than half
its operating cycle. A capacitor 122, of large value
the order of two microfarads, serves as a decoupling
r between the —105 volt supply and ground; to
ich, the plates of 102A and 102B are connected.

'he B+ voltage for drivers 104A and 104B is obtained
ough the guide (G–11, G–12) to anode capacity of the
inter tube 72. Thus, as a sufficiently positive pulse
ears at the grid 124 of amplifier 104A, the triode
s into conduction thereby reducing the voltage drop
oss the triode and causing a negative shift in the po-
tial appearing at the guides G–11. In the next half
le, triode 104B is pulsed into conduction and provides
egative shift in potential for the guides G–12. Hence,
h each complete cycle of the input audio sine wave,
 glow is caused to rotate about the counter tube 72
means of alternate, negative pulsing of guides G–11
l guides G–12, once each, and in sequence, so as to
't the enabling glow from one of the cathodes to the
t in succession.

n counter 72, an output of fifteen volts is developed in
h cathode resistor as its respective cathode is energized
sequence and conducts through the tube to the anode.
'erring now to FIG. 7B, each of the respective cathode
tages is conducted via leads 126–134 to the respective
Is of a series of trigger tubes, shield-grid thyratrons
–144. The type 2D21 thyratron has been used with
ch success. The output voltage from the counter
hode, when applied to a grid of one of the thyratrons
–144, is sufficient to bring about initiation of the arc
hin the tube thereby firing the thyratrons into conduc-
1. As each of the thyratrons conducts in its turn, it
charges its respective .5 μfd. capacitor 146–154 through
espective high voltage coil 156–164 to ground. The
h voltage coil chosen is a Delco type coil which auto-
uces a peak voltage of 10,000 volts (10 kv.) at outputs
–174. Each of these low current, high voltage pulses
:onducted to a respective ionic switch (switches 64 of
J. 6) where it serves to ionize the matter in the switch
ity, thereby completing the circuit between the high-
tage D.C. power supplies 56 and their respective
arcing members or anodes 42. Thus, as each cathode of
counter tube 72 is sequentially enabled, a firing takes place
at a corresponding arcing member in the water.

Since a firing sequence only requires one complete
count or rotation around the cathodes, the equipment is
constructed so that the counter tube 72 is disabled after
the No. 9 cathode fires its respective thyratron 144. When
thyratron 144 fires (the last of a sequence) a negative
pulse is taken from its plate through capacitor 176 and
applied over line 178 to the grid of triode 74B in the
bi-stable multivibrator 74. Refer once again to FIG. 7A.
During firing, the stable state is with 74B conducting and
74A cut off. The negative pulse applied by line 178 and
diode 78 drives the grid of 74B negative, cutting off
conduction and sharply increasing the plate voltage at
74B. This plate voltage increase is conducted across
connection 82 to the grid of tube 74A, causing its con-
duction; which, in turn, holds 74B at cutoff by means of
the reduced voltage over the plate-grid bias connection
80. Thus, the multivibrator 74 is again in its other stable
state, that which maintains minus sixty volt bias on the
No. 10 cathode of counter tube 72 and restrains it from
the counting or glow rotation function. Switches 180
and 182, associated with the multivibrator 74, are nor-
mally open and can be used for manual start or reset by
providing —105 volt bias to the selected grid of the multi-
vibrator 74.

The power supply for the firing rate unit is conven-
tional and can be any of many well known in the art.
The requisites of B+ and regulated —105 volts are easily
provided in standard power supplies. The various bias
voltages called for can each be provided by appropriate
voltage dividers of proper polarity.

Figure 8:
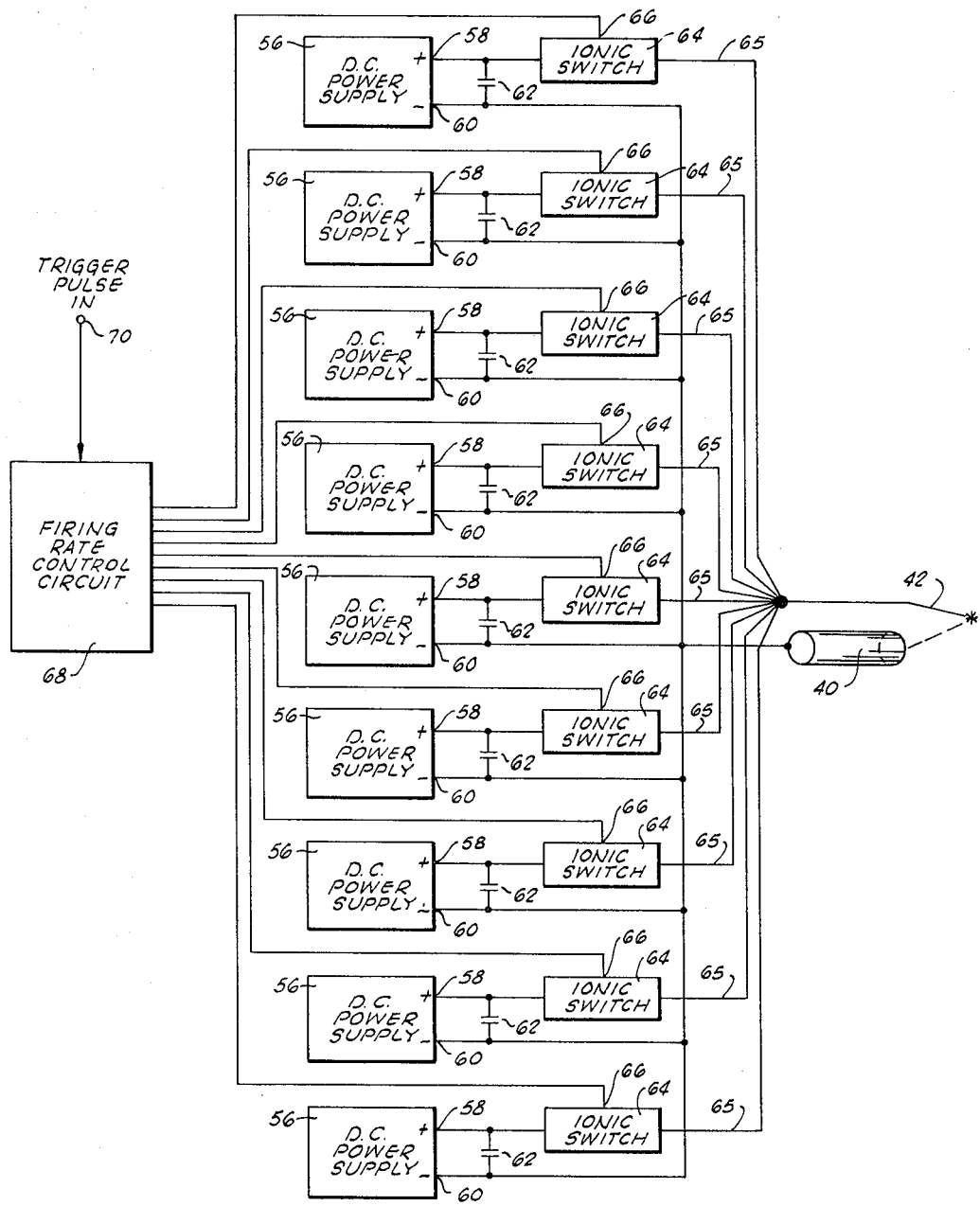
FIG. 8 is a block diagram of an alternative embodiment of the arcing control circuits and electrodes as shown in FIG. 6.

Referring to FIG. 8 there is shown an alternative em-
bodiment of the firing system as disclosed in FIG. 6.
Limitation of space or equipment may necessitate the use
of the equipment with a single anode 42 instead of a plu-
rality of anodes. If desired, and in some cases it may
be preferred, one anode 42 of heavy construction can be
used for firing each one of the successive high voltage
arcs to the cathode 40. This merely requires parallel-
ing of each of the high voltage cables 65 to one common
anode 42. The operation of the system remains the
same as to the firing rate control 68, power supplies 56
and ionic switches 64. The common cathode configura-
tion would be the same and the only change required is
that of combining the high voltage cables 65 by some
suitable connection for enabling multiple arcing from
the single anode 42.

From the foregoing it will be apparent that the present
invention provides an electric arc pressure wave source
which is capable of emitting a more efficient pressure wave
since it is comprised of a greater percentage of the fre-
quencies desired in marine seismic surveywork. The in-
vention is capable of emitting a pressure wave of a partic-
ular, chosen wave-shape, depending upon the dictates of
conditions incident to the survey. A relatively compact
and adjustable firing rate control unit offers the capability
of firing multiple high voltage arcs in rapid sequence to
enable a resultant pressure wave of desired intensity and
frequency distribution. This firing rate control offers the
further advantage that control and sequencing is per-
formed electronically and in rapid manner, thus causing
no delay which might disrupt a continuous survey. An-
other advantage incident to the firing of a pressure wave
which contains a greater percentage of desired frequencies
is in the increased ability to detect returned signals and
combat extraneous noise and disturbance.

Changes may be made in the combination and arrange-
ment of elements as heretofore set forth in this speci-
fication and shown in the drawings, it being understood
that changes may be made in the embodiments disclosed
without departing from the spirit and scope of the inven-
tion as defined in the following claims.

We claim:
1. In a system for conducting a seismic survey of subsurface structure covered by water:
    plural arcing means disposed in the water,
    plural switch means connected to the respective arcing means,
    plural power sources connected to the respective switch means, and
    a decade counter effective to provide a plurality of sequential output pulses, each pulse of which is effective to close a switch means and thus enable an arc, said decade counter being pulse-enabled to deliver sequential output pulses for a predetermined short period, the last pulse of the sequence effective to disable the counter output.
2. The system as defined in claim 1 wherein the duration of said counter output is controlled by a bistable multivibrator, said multivibrator enabling counter output of sequential pulses when pulsed to one stable state by timing pulse, said multivibrator disabling said counter output when pulsed to the other stable state by a predetermined one of the sequential pulses.

References Cited by the Examiner
UNITED STATES PATENTS

| | | | |
|---|---|---|---|
| 921,013 | 5/1909 | Shoemaker | 340—1 |
| 2,743,419 | 4/1956 | Chatterton et al. | 181—. |
| 3,022,852 | 2/1962 | Pavey | 340—1 |
| 3,174,096 | 3/1965 | Lichowsky | 323—2 |

BENJAMIN A. BORCHELT, *Primary Examiner.*

P. A. SHANLEY, *Assistant Examiner.*